US011824329B2

(12) United States Patent
Horak et al.

(10) Patent No.: US 11,824,329 B2
(45) Date of Patent: Nov. 21, 2023

(54) ARC APPARATUS FOR AN AIR INSULATED SWITCHGEAR

(71) Applicant: ABB Schweiz AG, Baden (CH)

(72) Inventors: Jiri Horak, Rousinov (CZ); Vaclav Kral, Brno (CZ); Jozef Bihary, Nove Mesto nad Vahom (SK)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/384,828

(22) Filed: Jul. 26, 2021

(65) Prior Publication Data

US 2022/0045488 A1 Feb. 10, 2022

(30) Foreign Application Priority Data

Aug. 4, 2020 (EP) .................. 20 189 410

(51) Int. Cl.
*H02B 13/025* (2006.01)
*H02B 13/035* (2006.01)
*H02H 9/02* (2006.01)

(52) U.S. Cl.
CPC ......... *H02B 13/025* (2013.01); *H02B 13/035* (2013.01); *H02H 9/02* (2013.01)

(58) Field of Classification Search
CPC .... H02B 13/025; H02B 13/035; H02B 1/565; H01H 33/664; H02H 9/02; H02H 9/08
USPC ........................................ 218/156
See application file for complete search history.

(56) References Cited

U.S. PATENT DOCUMENTS

| | | | | |
|---|---|---|---|---|
| 9,472,925 B2 * | 10/2016 | Zende | .................. | H02B 13/025 |
| 9,577,412 B2 * | 2/2017 | Prakash | ............... | H02B 13/025 |
| 9,899,810 B2 * | 2/2018 | Pawar | .................... | H02B 1/565 |
| 10,347,437 B2 * | 7/2019 | Johansson | .......... | H01H 71/1054 |
| 10,431,963 B2 * | 10/2019 | Rajauria | .................. | H02B 1/30 |
| 2015/0372463 A1 | 12/2015 | Prakash et al. | | |
| 2017/0301489 A1 * | 10/2017 | Palvadi | .................. | H01H 33/08 |

(Continued)

FOREIGN PATENT DOCUMENTS

| | | | |
|---|---|---|---|
| EP | 3671788 A1 | 6/2020 | |
| JP | 5889008 A | 5/1983 | |

(Continued)

OTHER PUBLICATIONS

Translation of KR 101381848 (Original document published Apr. 10, 2014) (Year: 2014).*

*Primary Examiner* — William A Bolton
(74) *Attorney, Agent, or Firm* — Leydig, Voit & Mayer, Ltd.

(57) ABSTRACT

An arc mitigation apparatus for an air insulated switchgear includes: a flap; a switch; and a control mechanism. The flap is installable in a wall of a compartment of a medium voltage switchgear. When the flap is installed in the wall of the compartment of the medium voltage switchgear, the flap permits when open air and/or gas passes through the flap from inside the compartment to outside the compartment. When the flap is installed in the wall of the compartment of the medium voltage switchgear, the flap is movable from a closed position to an open position due to a pressure difference between an inside of the compartment and an outside of the compartment. The switch activates based on movement of the flap. The control mechanism sets a flap threshold pressure for the flap with respect to the pressure difference that will move the flap.

13 Claims, 1 Drawing Sheet

(56) References Cited

U.S. PATENT DOCUMENTS

2019/0260190 A1* 8/2019 Ma .......................... H02B 1/20
2019/0386470 A1* 12/2019 Cortinovis ............. H02B 11/04

FOREIGN PATENT DOCUMENTS

KR       101381848 B1    4/2014
SU          691972 A1   10/1979

* cited by examiner

ARC APPARATUS FOR AN AIR INSULATED SWITCHGEAR

CROSS-REFERENCE TO PRIOR APPLICATION

Priority is claimed to European Patent Application No. EP 20 189 410.2, filed on Aug. 4, 2020, the entire disclosure of which is hereby incorporated by reference herein.

FIELD

The present invention relates to an arc mitigation apparatus for an air insulated switchgear, an arc mitigation system for an air insulated switchgear, a compartment for an air insulated switchgear, as well as to air insulated switchgear.

BACKGROUND

An internal arc fault is one of the most challenging condition for a medium voltage (MV) Air insulated Switchgear (AIS).

Such MV AIS, also called panels, must meet internal arc classification (IAC) requirements.

The compartment or compartments of the air insulated switchgear are either built so sturdily that they can withstand the pressure build up due to an internal arc, or pressure relief flaps must open to vent hot gases and particles safely out of the compartment in order that the integrity of the compartment or compartments is maintained.

Furthermore, current limiters, such an Ith limitor or limiters, are utilized. These are switches, which when operated or triggered when an internal arc fault occurs, ensures that a control system then rapidly shuts down the power source, limiting the damage of the switchgear and/or switch station.

However, there is a need to provide for better protection in the situation when a low-energy arc fault occurs, which may not lead to operation of the pressure relief flap and/or to operation of the current limiter.

SUMMARY

In an embodiment, the present invention provides an arc mitigation apparatus for an air insulated switchgear, the apparatus comprising: a flap; a switch; and a control mechanism, wherein the flap is configured to be installed in a wall of a compartment of a medium voltage switchgear, wherein, when the flap is installed in the wall of the compartment of the medium voltage switchgear, the flap is configured to permit when open air and/or gas passes through the flap from inside the compartment to outside the compartment, wherein, when the flap is installed in the wall of the compartment of the medium voltage switchgear, the flap is configured to move from a closed position to an open position due to a pressure difference between an inside of the compartment and an outside of the compartment, wherein the switch is configured to activate based on movement of the flap, and wherein the control mechanism is configured to set a flap threshold pressure for the flap with respect to the pressure difference that will move the flap.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1A:
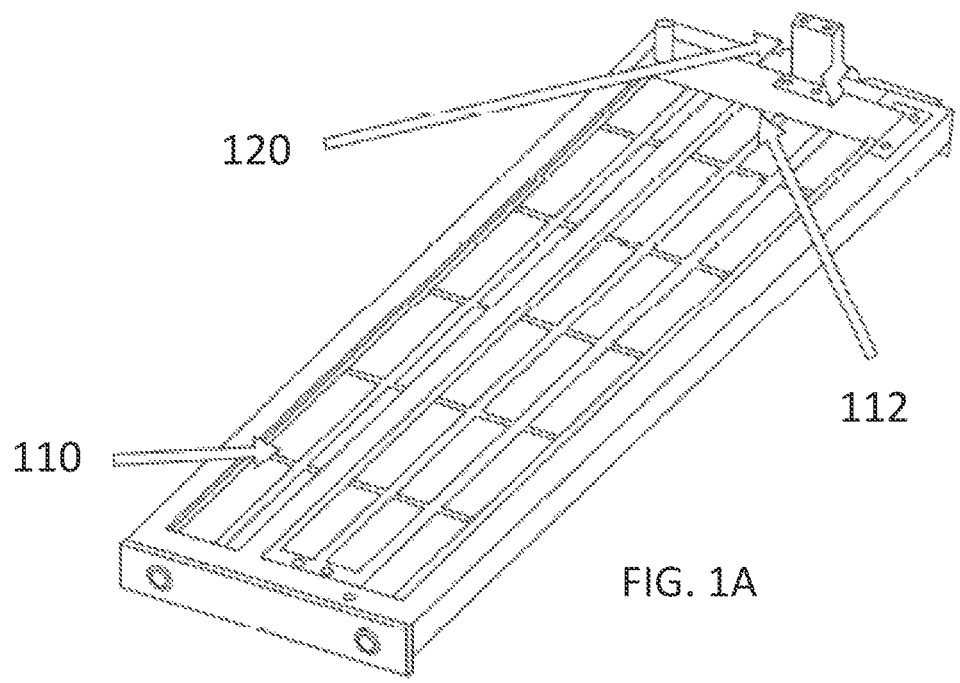
FIGS. 1A and 1B show an example of a flap, switch and control mechanism of an arc mitigation apparatus for an air insulated switchgear and/or of an arc mitigation system for an air insulated switchgear, and where the apparatus and system can be installed in a compartment of an air insulated switchgear.

In an embodiment, the present invention provides an improved technology that is suitable for the protection of low energy arc faults.

In a first aspect, there is provided an arc mitigation apparatus for an air insulated switchgear. The apparatus comprises:

a flap;
a switch; and
a control mechanism.

The flap is configured to be installed in a wall of a compartment of a medium voltage switchgear. When the flap is installed in the wall of the compartment of the medium voltage switchgear the flap is configured to, when open, permit air and/or gas to pass through the flap from inside the compartment to outside the compartment. When the flap is installed in the wall of the compartment of the medium voltage switchgear the flap is configured to move from a closed position to an open position due to a pressure difference between the inside of the compartment and the outside of the compartment. The switch is configured to activate based on movement of the flap. The control mechanism is configured to set a flap threshold pressure for the flap with respect to the pressure difference that will move the flap.

In an example, the control mechanism comprises a control spring.

In an example, the switch is configured to activate based on movement of the flap from the closed position to the open position.

In an example, the switch is configured to activate based on movement of the flap away from the closed position.

In an example, the switch is configured to activate based on a magnitude of movement of the flap away from the closed position.

In an example, the switch when activated is configured to trigger a current limiter.

In a second aspect, there is provided an arc mitigation system for an air insulated switchgear. The system comprises:

a flap;
a switch;
a control mechanism; and
a current limiter.

The flap is configured to be installed in a wall of a compartment of a medium voltage switchgear. When the flap is installed in the wall of the compartment of the medium voltage switchgear the flap is configured to permit, when open, air and/or gas to pass through the flap from inside the compartment to outside the compartment. When the flap is installed in the wall of the compartment of the medium voltage switchgear the flap is configured to move from a closed position to an open position due to a pressure difference between the inside of the compartment and the outside of the compartment. The control mechanism is configured to set a flap threshold pressure for the flap with respect to the pressure difference that will move the flap. The switch is configured to activate based on movement of the flap. Activation of the switch is configured to trigger the current limiter.

In an example, the control mechanism comprises a control spring.

In an example, the switch is configured to activate based on movement of the flap from the closed position to the open position.

In an example, the switch is configured to activate based on movement of the flap away from the closed position.

In an example, the switch is configured to activate based on a magnitude of movement of the flap away from the closed position.

In a third aspect, there is provided a compartment for an air insulated switchgear. The compartment comprises:
a flap;
a switch; and
a control mechanism.

The flap is installed in a wall of the compartment. The flap is configured to permit, when open, air and/or gas to pass through the flap from inside the compartment to outside the compartment. The flap is configured to move from a closed position to an open position due to a pressure difference between the inside of the compartment and the outside of the compartment. The switch is configured to activate based on movement of the flap. The control mechanism is configured to set a flap threshold pressure for the flap with respect to the pressure difference that will move the flap.

In a fourth aspect, there is provided a medium voltage air insulated switchgear comprising an apparatus according to the first aspect.

In a fifth aspect, there is provided a medium voltage air insulated switchgear comprising a system according to the second aspect.

In a sixth aspect, there is provided a medium voltage air insulated switchgear comprising a current limiting apparatus according to the third aspect.

The above aspects and examples will become apparent from and be elucidated with reference to the embodiments described hereinafter.

Figure 1B:
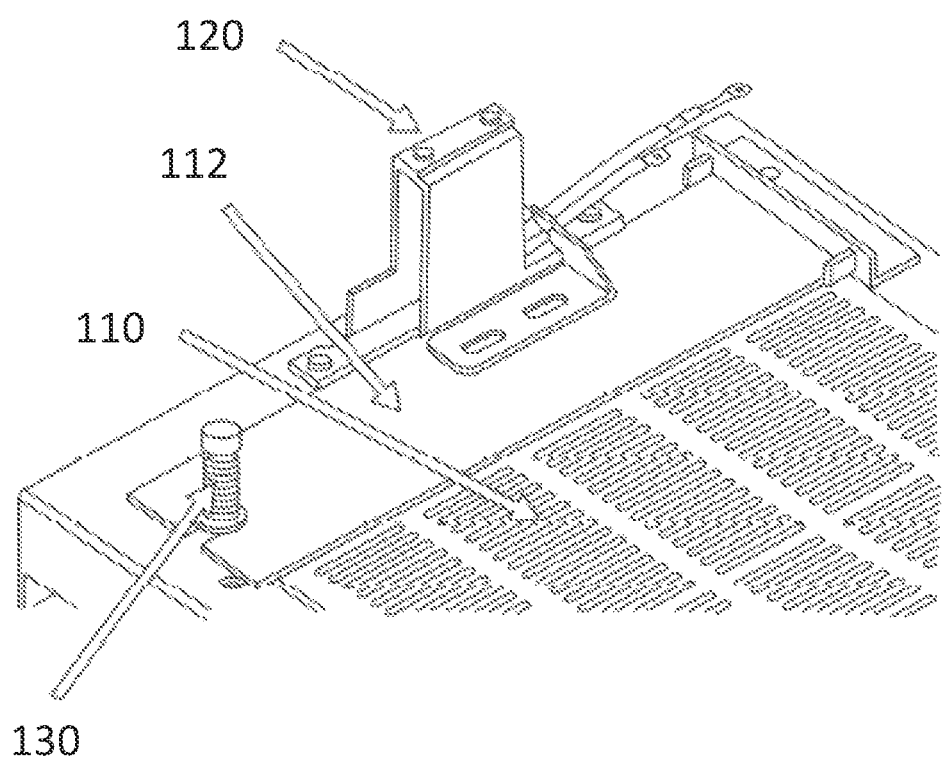

FIG. 1 relates to an apparatus that mitigates the effects of an internal arc in a compartment of an air insulated switchgear, a system that mitigates the effects of an internal arc in a compartment of an air insulated switchgear, a compartment for an air insulated switchgear having such internal arc mitigation technologies, as well as to air insulated switchgear that has such internal arc mitigation technologies.

The arc mitigation apparatus for an air insulated switchgear comprises:
a flap 110;
a switch 120; and
a control mechanism 130.

The flap 110 is configured to be installed in a wall of a compartment of a medium voltage switchgear. When the flap 110 is installed in the wall of the compartment of the medium voltage switchgear the flap 110 is configured to permit, when open, air and/or gas to pass through the flap 110 from inside the compartment to outside the compartment. When the flap 110v is installed in the wall of the compartment of a medium voltage switchgear the flap 110 is configured to move from a closed position to an open position due to a pressure difference between the inside of the compartment and the outside of the compartment. The switch 120 is configured to activate based on movement of the flap 110. The control mechanism 130 is configured to set a flap threshold pressure for the flap 110 with respect to the pressure difference that will move the flap 110.

Thus, when an internal arc event fault occurs within a compartment of an air insulated switchgear, there is an extremely rapid rise in temperature, gases are released and the air and gases are heated to very high temperatures very rapidly, leading to very high pressures that can be dangerous. At the same time the arc itself can lead to damage of the switchgear and other systems. The new apparatus, has a flap 110 installed in a wall of the compartment, and that can be smaller than a normal gas release flap and be auxiliary 112 to the gas release flap, or replace the gas release flap itself. However, the pressure increasing the compartment leads to movement of the flap 110, 112 from a closed position to an open position, thereby venting gas from the compartment and mitigating the effects of overpressure and a compartment—as discussed, the new flap can act alone in mitigating the effect of overpressure or can be auxiliary 112 to other gas release flaps in the compartment. By being auxiliary, it can be smaller and less massive than normal gas release flaps and therefore move more rapidly. The movement of the new flap 110, 112 also triggers a switch 120 that can be used to shut down the power source to utilisation of a current limiter, thereby mitigating the effects of the arc itself. A control mechanism 130 is usable to adjust how the flap 110, 112 reacts to pressure within the compartment, enabling fine adjustment of the system such that the flap 110, 112 moves and triggers power shutdown at a controlled pressure, that can be a relatively low overpressure enabling the mitigation of low-energy internal arc events that otherwise would not be caught, because such events might not open the normal overpressure gas release flaps but the new adjustable, and if necessary less massive, flap 110, 112 can be adjusted to move at these low pressures and trigger at the same time a current limiting system.

In an example, the switch is an Ith Switch 120 as part of an Ith Limiter, as provided by ABB.

In an example, the control mechanism 130 is configured to set a flap threshold pressure for the flap 110, 112 with respect to the pressure difference that will move the flap from the closed position to the open position.

In an example, the flap is an auxiliary flap 112 of a gas-release flap.

In an example, the flap is configured to act as an auxiliary flap of a gas-release flap.

According to an example, the control mechanism comprises a control spring 130.

Thus, a simple mechanism is provided by a spring 130 that can be used to set a pressure difference at which the flap 110, 112 begins to move, and/or set how far the flap will move as a function of overpressure or pressure difference thereby enabling precise adjustment of when the flap 110, 112 starts to enables gas to pass and when the switch 120 will be triggered thereby enabling power shutdown to be initiated.

According to an example, the switch 120 is configured to activate based on movement of the flap 110, 112 from the closed position to the open position.

According to an example, the switch 120 is configured to activate based on movement of the flap 110, 112 away from the closed position.

According to an example, the switch 120 is configured to activate based on a magnitude of movement of the flap 110, 112 away from the closed position.

Thus, the switch 120 can be activated as soon as the flap 110, 112 begins to move, or after the flap has moved a certain distance on its movement from the close to open position, or when the flap is moved all the way from close to the open position. This enables, complete control for an operator with respect to when system shutdown will occur and under what circumstances.

According to an example, the switch 110, 112 when activated is configured to trigger a current limiter.

In an example, the current limiter is part of a control system configured to rapidly shut down a power source for the switchgear.

The arc mitigation system for an air insulated switchgear comprises:
a flap 110, 112;
a switch 120;
a control mechanism 130; and
a current limiter.

The flap is configured to be installed in a wall of a compartment of a medium voltage switchgear. When the flap is installed in the wall of the compartment of a medium voltage switchgear the flap is configured to permit, when open, air and/or gas to pass through the flap from inside the compartment to outside the compartment. When the flap is installed in the wall of the compartment of a medium voltage switchgear the flap is configured to move from a closed position to an open position due to a pressure difference between the inside of the compartment and the outside of the compartment. The control mechanism is configured to set a flap threshold pressure for the flap with respect to the pressure difference that will move the flap. The switch is configured to activate based on movement of the flap. Activation of the switch is configured to trigger the current limiter.

In an example, the switch is an Ith Switch.

In an example, the control mechanism is configured to set a flap threshold pressure for the flap with respect to the pressure difference that will move the flap from the closed position to the open position.

In an example, the current limiter is part of a control system configured to rapidly shut down a power source for the switchgear.

In an example, the flap is an auxiliary flap of a gas-release flap.

In an example, the flap is configured to act as an auxiliary flap of a gas-release flap.

According to an example, the control mechanism comprises a control spring.

According to an example, the switch is configured to activate based on movement of the flap from the closed position to the open position.

In the system described herein, the switch is configured to activate based on movement of the flap away from the closed position.

According to an example, the switch is configured to activate based on a magnitude of movement of the flap away from the closed position.

The compartment for an air insulated switchgear comprises:
a flap;
a switch; and
a control mechanism.

The flap is installed in a wall of the compartment. The flap is configured to permit, when open, air and/or gas to pass through the flap from inside the compartment to outside the compartment. The flap is configured to move from a closed position to an open position due to a pressure difference between the inside of the compartment and the outside of the compartment. The switch is configured to activate based on movement of the flap. The control mechanism is configured to set a flap threshold pressure for the flap with respect to the pressure difference that will move the flap.

In an example, the switch is an Ith Switch.

In an example, the control mechanism is configured to set a flap threshold pressure for the flap with respect to the pressure difference that will move the flap from the closed position to the open position.

In an example, the control mechanism comprises a control spring.

In an example, the flap is an auxiliary flap of a gas-release flap.

In an example, the flap is configured to act as an auxiliary flap of a gas-release flap.

In an example, the switch is configured to activate based on movement of the flap from the closed position to the open position.

In an example, the switch is configured to activate based on movement of the flap away from the closed position.

In an example, the switch is configured to activate based on a magnitude of movement of the flap away from the closed position.

In an example, the switch when activated is configured to trigger a current limiter.

In an example, the current limiter is part of a control system configured to rapidly shut down a power source for the switchgear.

From the above description, it is clear that a medium voltage air insulated switchgear can comprises the above described apparatus.

From the above description, it is clear that a medium voltage air insulated switchgear can comprises the above described system.

From the above description, it is clear that a medium voltage air insulated switchgear can comprises the above described apparatus.

Thus, a response in terms of pressure and speed is improved with respect to addressing an internal arc event, where the control mechanism that can be in the form of a spring can be used to control this response. A faster and/or more sensitive response is achieved.

By having an improved response, low-energy internal arc events can be mitigated and for all internal arc fault events, the energy released in the compartment during the internal arc is reduced, limiting the damage to the compartment and/or switchgear and improving the safety to personnel.

The flap can for example be a sheet metal part, and can be smaller than normally used to gas release flaps, as shown in FIG. 1 where the new flap is shown as an auxiliary flap integrated into an existing gas release flap at the top end of the gas release flap adjacent to the switch, which in this case is an Ith limiter switch. The flap need not be integrated into an existing gas relief flap, but can be placed into any part of a compartment envelope to provide optimal functionality.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An arc mitigation apparatus for an air insulated switchgear, the apparatus comprising:
    a flap;
    a switch; and
    a control mechanism that comprises a control spring,
    wherein the flap is configured to be installed in a wall of a compartment of a medium voltage switchgear,
    wherein, when the flap is installed in the wall of the compartment of the medium voltage switchgear, the flap is configured to permit when open air and/or gas passes through the flap from inside the compartment to outside the compartment,
    wherein, when the flap is installed in the wall of the compartment of the medium voltage switchgear, the flap is configured to move from a closed position to an open position due to a pressure difference between an inside of the compartment and an outside of the compartment,
    wherein the switch is configured to activate based on movement of the flap, and
    wherein the control mechanism is configured to set a flap threshold pressure for the flap with respect to the pressure difference that will move the flap.

2. The apparatus of claim 1, wherein the switch is configured to activate based on movement of the flap from the closed position to the open position.

3. The apparatus of claim 1, wherein the switch is configured to activate based on movement of the flap away from the closed position.

4. The apparatus of claim 3, wherein the switch is configured to activate based on a magnitude of movement of the flap away from the closed position.

5. The apparatus claim 1, wherein the switch, when activated, is configured to trigger a current limiter.

6. A medium voltage air insulated switchgear, comprising: the apparatus of claim 1.

7. An arc mitigation system for an air insulated switchgear, the system comprising:
    a flap;
    a switch;
    a control mechanism that comprises a control spring; and
    a current limiter,
    wherein the flap is configured to be installed in a wall of a compartment of a medium voltage switchgear,
    wherein, when the flap is installed in the wall of the compartment of the medium voltage switchgear, the flap is configured to permit when open air and/or gas passes through the flap from inside the compartment to outside the compartment,
    wherein, when the flap is installed in the wall of the compartment of the medium voltage switchgear, the flap is configured to move from a closed position to an open position due to a pressure difference between an inside of the compartment and an outside of the compartment,
    wherein the control mechanism is configured to set a flap threshold pressure for the flap with respect to the pressure difference that will move the flap,
    wherein the switch is configured to activate based on movement of the flap, and
    wherein activation of the switch is configured to trigger the current limiter.

8. The system of claim 7, wherein the switch is configured to activate based on movement of the flap from the closed position to the open position.

9. The system of claim 7, wherein the switch is configured to activate based on movement of the flap away from the closed position.

10. The system of claim 9, wherein the switch is configured to activate based on a magnitude of movement of the flap away from the closed position.

11. A medium voltage air insulated switchgear, comprising:
    the system of claim 7.

12. A compartment for an air insulated switchgear, the compartment comprising:
    a flap;
    a switch; and
    a control mechanism that comprises a control spring,
    wherein the flap is installed in a wall of the compartment,
    wherein the flap is configured to permit when open air and/or gas passes through the flap from inside the compartment to outside the compartment,
    wherein the flap is configured to move from a closed position to an open position due to a pressure difference between an inside of the compartment and an outside of the compartment,
    wherein the switch is configured to activate based on movement of the flap, and
    wherein the control mechanism is configured to set a flap threshold pressure for the flap with respect to the pressure difference that will move the flap.

13. A medium voltage air insulated switchgear, comprising:
    the compartment of claim 12.

* * * * *